United States Patent [19]

Ruby

[11] 4,355,760

[45] Oct. 26, 1982

[54] CONTROL UNIT FOR A MULTI-UNIT BUILDING

[76] Inventor: Ernest D. Ruby, 4335 N. Francisco, Chicago, Ill. 06018

[21] Appl. No.: 937,110

[22] Filed: Aug. 28, 1978

[51] Int. Cl.³ .......................... F24F 3/00; G05D 23/00
[52] U.S. Cl. ........................................ 236/47; 165/22; 236/78 B; 236/94; 374/115
[58] Field of Search .................. 237/9 R, 8 R; 236/94, 236/47, 91 E, 91 G, 78 B; 165/22; 73/342

[56] References Cited

U.S. PATENT DOCUMENTS

| | | | |
|---|---|---|---|
| 2,272,492 | 2/1942 | Weyher | 236/78 B X |
| 2,285,118 | 6/1942 | Jones | 73/342 |
| 2,323,411 | 7/1943 | Newman | 236/91 E |
| 2,691,889 | 10/1954 | Dion et al. | 73/342 |
| 3,665,766 | 5/1972 | Johnston | 73/342 |
| 3,719,071 | 3/1973 | Hohenberg | 73/341 |
| 3,964,677 | 6/1976 | Schalow et al. | 236/46 R |

*Primary Examiner*—William E. Wayner

[57] ABSTRACT

Three or more temperature sensors are positioned at various selected locations in a building. These sensors are connected to an averaging circuit whose function is to provide an electrical signal which is functionally related to the average temperature of all these sensors. This electrical signal is compared with another signal which is related to a pre-determined reference temperature for the building. If the electrical signal related to the reference temperature is greater than the electrical signal related to the average temperature indicated by the sensors, a comparator circuit turns a boiler on to heat the building. When the reverse situation is true, the comparator circuit operates to turn the boiler off.

14 Claims, 8 Drawing Figures

CONTROL UNIT FOR A MULTI-UNIT BUILDING

This invention relates to a heat control unit for an office or an apartment building.

BACKGROUND AND BRIEF SUMMARY

Heretofore, multi-unit office and apartment buildings were typically heated in a number of ways. These include steam heat with radiators in each space, hot water heat with radiators in each space, forced air with air vents in each space, and hot water baseboard heating.

The heat in the building was controlled by several devices.

These include a return-line aquastat. This device had a water thermostat that was connected to the return line of the boiler. When the temperature indicated by the water thermostat of aquastat fell below a predetermined value, the boiler turned on.

The disadvantage of the return-line aquastat was that there was no single direct functional relationship between the temperature in the return line and the temperature in the building. As a consequence, the boiler could be operated at temperatures which were higher than necessary or could be operated in a cycle which was below that required to heat the building. A boiler controlled in this way is insensitive to external temperatures. As a result, if the outside temperature were to rise 35° for example, the aquastat could cause the boiler to operate at too frequent a level for that particular temperature, because it only looks at the return line temperature. On the other hand, if the temperature dropped 35°, the aquastat could cause the boiler to operate at a level below the heat requirements of the building.

To prevent this from happening, the aquastats were used in conjunction with timers which turned the boilers on and off at predetermined intervals. the aquastat would modify the effect of the timer, causing the boiler to turn on or off depending on the return line temperature in conjunction with a pressure control. However, the heat control unit was still insensitive to the ambient temperature and to overcome this defect, an outside temperature sensor had to be used. This outside sensor was used to further modify the operation of the boiler and override everything when the outside temperature rose above 55° F. or 60° F., depending on the age or health of the building occupants. The reason is, above 55° or 60° F., buildings generally do not need heat because of the heat radiated by the people inside the building, the effects of the sun, the greenhouse effect, electrical appliances, and the heat generated by pilot lights in the building.

Nonetheless, these arrangements were still not satisfactory because the resulting heat control unit still did not control the temperature of the building efficiently, causing a waste of energy.

Heretofore, when the cost of energy was much lower, this defect was not an important factor. However, changing circumstances related to the increased price of fuel has now made the disadvantages of the arrangements described above unacceptable.

Another way to control the heat in a building was by a thermostat control. In this kind of heat control unit, a thermostat was positioned in a pre-selected room to control the boiler. A disadvantage of this arrangement was that the building manager could not conveniently check the thermostat to see if it had been tampered with. Furthermore, the manager or operator of the building could not be sure if the thermostat had been affected by the occupier of a room as, for example, by opening windows or putting a heater near the thermostat. This could cause the boiler to operate in an inefficient manner. Another problem with this arrangement was caused by changes in the direction of the wind, which could make the temperature of the particular apartment or unit in which the thermostat was located not representative of the conditions in the building. This could be partially overcome by putting a thermostat in an adjacent space and requiring that a thermostat change in both spaces occur before the boiler would actually operate. Nonetheless, the disadvantage of this arrangement is that portions of the building could still be at an objectionable temperature because the thermostats would not provide enough information for the boiler operator to make the necessary temperature adjustments for the building.

A further way to control the temperature in buildings was through the use of an outside sensor in hot water controlled buildings. This sensor regulated the temperature of the return hot water line to the boiler as a function of the temperature outside the building. This is possible because there is a linear relationship between changes in the outside temperature and changes in the inside return waterline temperature. This linear relationship can be used to establish a somewhat constant inside temperature. However, this technique of using an outside sensor to regulate the temperature of the return pipe has been applied to steam heated buildings with only a limited success. The reason is that in steam heated buildings there is no continuity of temperature in the steam lines and radiators unless they are filled with steam. In contrast, in buildings heated by hot water, there is always water in the lines and radiators so the temperature in the lines and radiators has some connection with the temperature in the building and the temperature in the return lines. It is apparent that when boilers are off in steam heated buildings, the steam condenses in the lines so that the temperature in the lines and radiators bears no clear relationship to the temperature in the building. To overcome this problem, efforts were made using an outside sensor for a steam heated building. This involved using the voltage output of the outside sensor to make a modification to the operation of the timer in order to adjust the number of minutes the boiler operated during an hourly heat cycle. But this system was insensitive to morning start-up as it was often necessary to run the boiler for one full hour for each hourly cycle during the morning and only 15 minutes of each hour later in the day. Additional trippers had to be added to the timer to account for the longer runs during the morning. These trippers prevented early morning chill but it created problems because the afternoon heat cycles kept building up the temperature in the building to a higher level than was necessary, causing loss. As must be apparent, differences in boiler outputs, differing heat losses from one building to another, and so forth, required complex separate adjustments for each control once installed.

It is the purpose of the heat control unit constructed according to the principles of this invention to provide a heat control unit which can be used to control the heat in buildings regardless of the way the buildings are heated.

Another important object of this invention is to provide a temperature control system for a building which is compatible with steam or hot water heating and which provides a more precise control of the temperature inside the building through a more efficient operation of the boiler and which provides information regarding the temperature in the various portions of the building and the average temperature in the building.

These and other objects of this invention will become more apparent when better understood in the light of the accompanying specification and drawings wherein:

Figure 1:
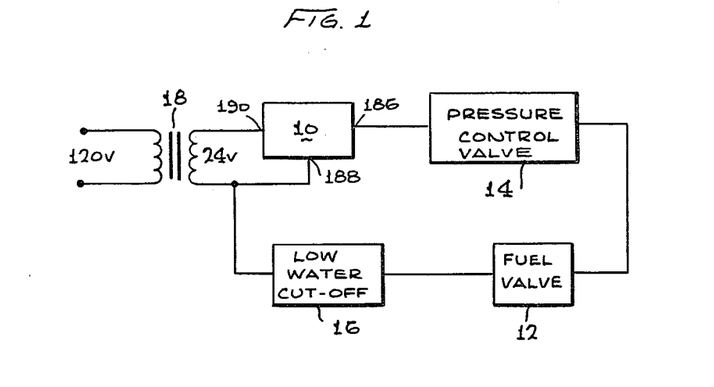
FIG. 1 is a diagramatic view illustrating the way the temperature control unit is connected to the power lines and fuel valve of a boiler in a typical installation.

Referring now to FIG. 1 of the drawings, a heating control system indicated generally by the reference numeral 10 is connected to a solenoid actuated fuel valve 12 of a boiler 32 through a conventional pressure control valve 14. The boiler is provided with a low water cutoff valve 16 in a manner well known in the art. The entire system is typically powered by a 24-volt source provided by conventional 120 volt transformer 18.

The heat control system includes a plurality of temperature transducers or heat sensors 20, 22, 24, 26, 28, 30 and 31. See FIGS. 2 and 3. Each of these sensors, as will be described below, provide a voltage output which is linearly related to the temperature around the sensor.

Figure 2:
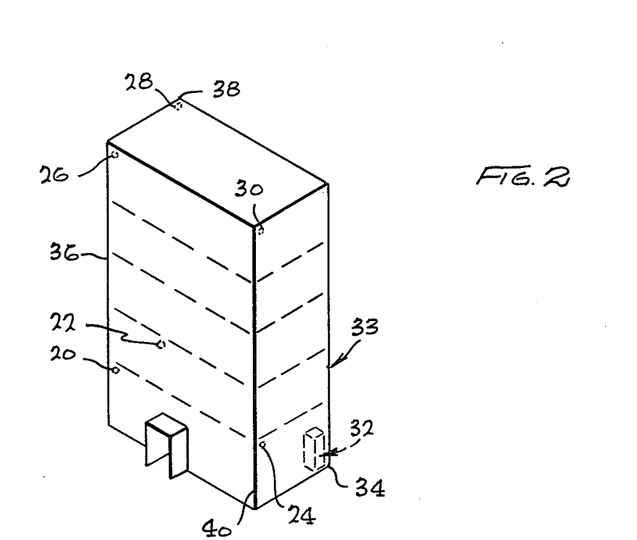
FIG. 2 is a perspective view of a building showing the relationship between the boiler and the position of various sensors in the building.

These sensors are mounted in a building 33 such as an apartment building or an office building as shown in the drawing and which is based on practical experience. For example, if a building is generally rectangular in cross-section, as shown in FIG. 2, with a boiler 32 mounted in a corner 34 of that building the sensors would be positioned in apartments or spaces at the remaining corners of the building and at the first and top floor of the building for a total of six sensors. Experience has indicated that a temperature average obtained with this type of arrangement will provide a pretty good indication of the average temperature throughout the building. Consequently, as shown in FIG. 2, the sensors are positioned at corners 36, 38 and 40, and at the first and top floor of the building.

In the embodiment shown in FIG. 2, only six sensors are used. As will be described below, the principles of this invention may be practiced with larger numbers of sensors, but considerations of cost, along with a rapidly decreasing advantage which can be obtained from additional sensors suggests that the number of sensors be limited to around six. Of course, if the building is oddly shaped, or if other buildings or structures in the neighborhood of the building, or adjacent topographical features affect the direction of the wind against the building, additional sensors may be necessary to provide a better indication of the temperature throughout the building.

Under these circumstances, or because of special circumstances involving the occupants of the spaces in the building, some of the sensors may read unusually high or unusually low. This could affect the average value of the output of the sensors in such a way that the average temperature is a value which cannot be used efficiently to control the boiler. To prevent this from happening, the heat control system could be arranged to eliminate those sensors which have the highest and lowest reading. The could be done through the use of comparators and logic circuits functioning as "AND", "OR" and "NOR" gates. Elimination of the sensors which have the highest and lowest readings would provide an average temperature which is a better indication of the conditions in the building and provide a more efficient control of the boiler.

As will be described below, an electrical signal, e.g., a current proportional to the average value of the output of the sensors, affects the heat control unit 10 in such a way as to cause the boiler 32 to turn on whenever the temperature in the building falls below a particular predetermined reference value, e.g., 70° F. Following through the heating cycles, whenever the temperature in the building increases above an adjustable temperature rise range, the boiler will turn off.

Figure 3:
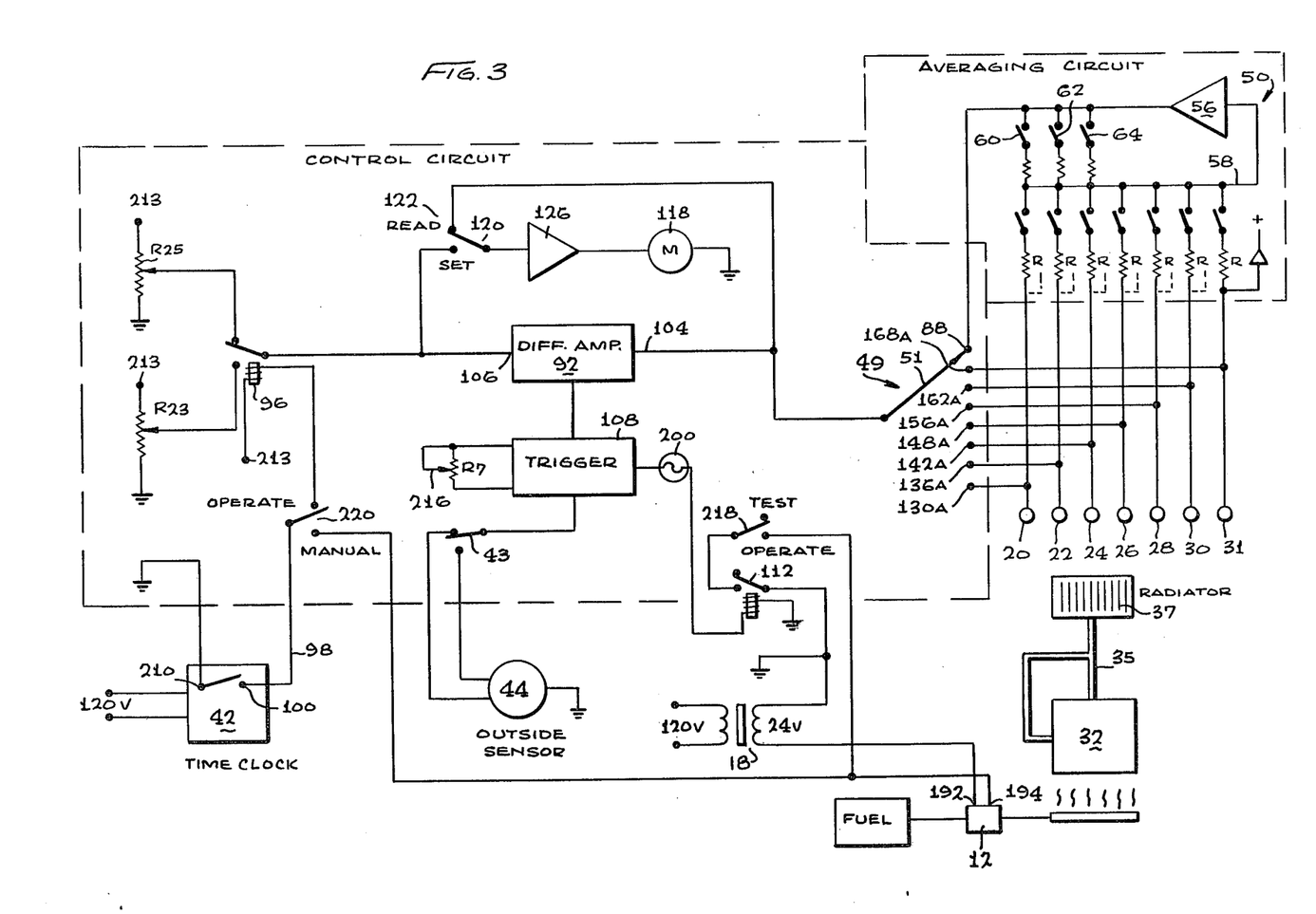
FIG. 3 is another diagram illustrating the relationship between the inside sensors, the outdoor sensors, the boiler and radiator, the time clock, and the circuit of the heat control unit.
Figure 7:
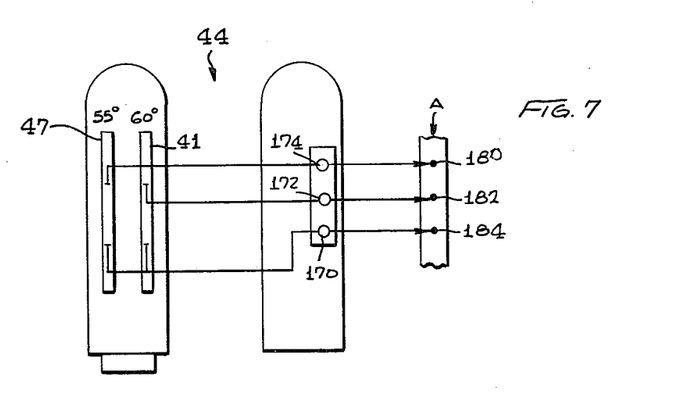
FIG. 7 is an elevational view showing the electrical connections on the outside sensor.

Considerations of economy permit a building to be kept at a lower temperature at night than during the day without undue discomfort to the tenants. Accordingly, the heat control unit is modified by a time clock 42 to accomplish this. In addition, an outside heat sensor 44 is provided to cause the heat control 10 to turn off the boiler 32 whenever the external temperature outside the building exceeds 55° F. or 60° F., according to choice. The outside sensor 44 comprises two mercury switches 47 and 41 which operate in such a way that as the temperature rises, the mercury expands, making an electrical connection in a manner well known in the art. One such switch closes at 55° and the other at 60° F., see FIG. 7. A switch 43 is connected to the sensor 44 to put the selected mercury switch into the circuit so that outside reference temperature can be selected.

Figure 4:
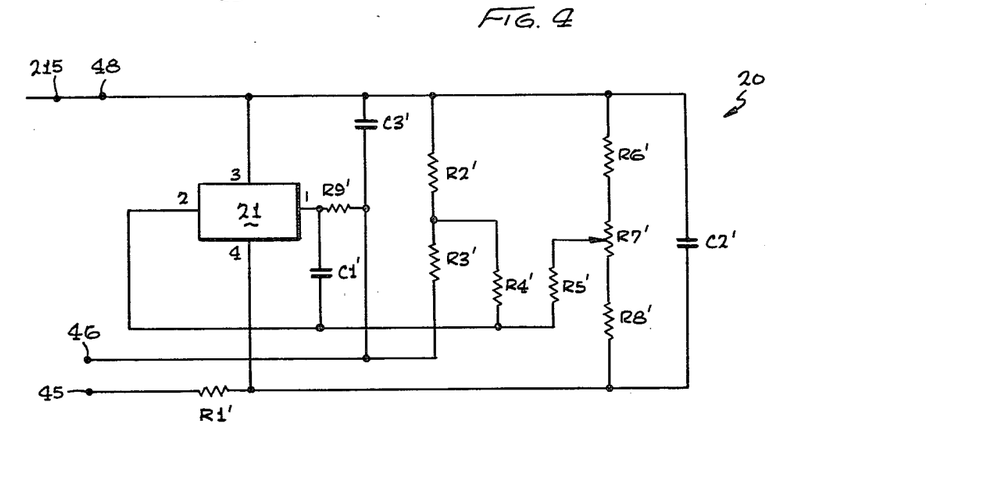
FIG. 4 is a circuit diagram of the temperature sensors used with this invention.

Each sensor, such as sensor 20 shown in FIG. 4, is built around a conventional solid state temperature sensor 21 which in the embodiment shown is an integrated circuit #LM 3911H made by Texas Instruments. It is not practical to use the temperature sensor 21 "as is" because its gain is too low. To provide an adequate signal to noise ratio, its gain must be increased so less amplification will be required in succeeding circuits. Design considerations suggest that an output of 40 millivolts for each degree Fahrenheit would be a good choice. Since the output of the TI circuit by itself is around 10 millivolts per degree centigrade, elementary considerations show that a gain of 7.2 would provide the sensor circuit with the desired 40 millivolts per degree Fahrenheit output.

The circuit shown in FIG. 4 will provide the desired gain in output if the circuit components shown in FIG. 4 have the following values: R1'—1.0K, R2'—2.2K, R3'—5.6K, R4'—47K, R5'—47K, R6'—8.2K, and R7'—a 1K potentiometer, R8'—1.8K, R9'—100 ohms, C1' 0.01UF, C2' 0.1UF, and C3' 0.1 UF.

Resistances R'2, R'3, R'4 and R'5 determine the temperature and voltage change ratio, and resistance R6 and R8 establish the proper reference voltage range. The 1K potentiometer R7 is chosen and adjusted so that the terminal 46 of this sensor will be at 8 volts when the ambient temperature is 60° and 10 volts when the ambient temperature is at 55° for reasons to be described below. Analysis of the circuits shown in FIG. 4 indicates that as the temperatures around the sensors decrease, the voltage at terminal 46 increases linearly and when the temperatures around the sensors increase the voltage at terminal 46 decreases linearly.

Figure 5:
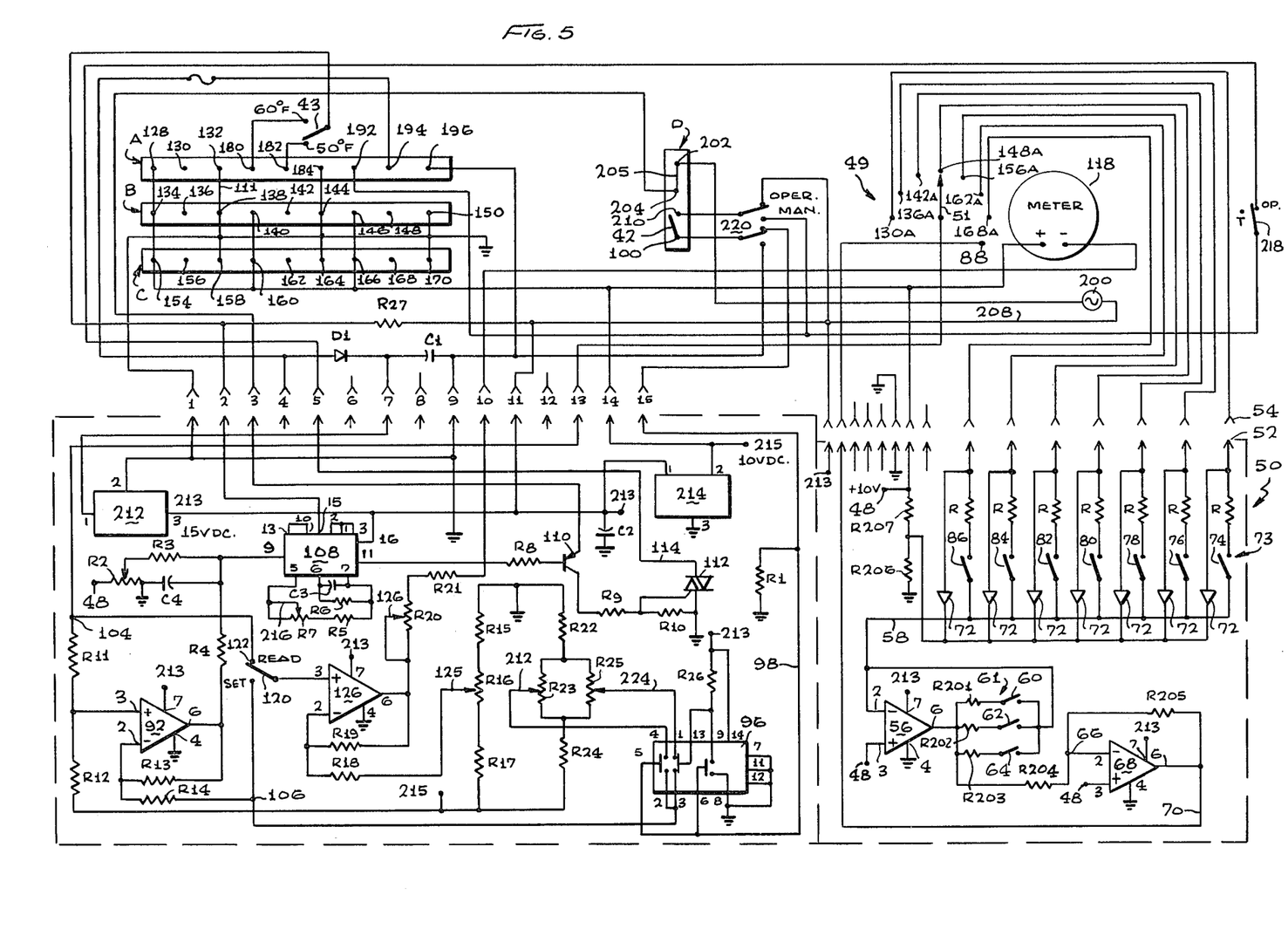
FIG. 5 is a circuit diagram of a heat control system of this invention.

The output terminals 46 of each sensor are connected to the terminals 130A, 136A, 142A, 148A, 156A, 162A, and 168A of a rotary switch 49 as shown in FIG. 5. The rotary switch also includes an average terminal 88. As stated above, the voltages represented by the temperatures around the sensors have to be averaged. This is done through the use of an averaging circuit indicated generally by the reference numeral 50 shown in FIG. 5.

The averaging circuit is mounted on a printed circuit board which has a male connector portion 52 which is designed to mate with a female connector portion 54. When the averaging circuit 50 is connected to the connectors of the control circuit, current from each of the activated sensors used with the heat control unit passes through an indentical resistor R which is 100K in value, and which forms part of an averaging circuit as will be described below.

The averaging circuit is built around a solid state integrated circuit amplifier number 741 connected as an operational amplifier 56. The function of resistances R connected to each sensor is to convert the voltage output from each sensor to a current proportional to the temperature. These currents are all connected to a bus line 58, which, as shown in FIG. 5, is connected to the input of amplifier 56 at terminal 2. In this way, the currents are all summed at the input of the amplifier.

The output of amplifier 56 at terminal 6 is selectively connected to resistances R201, R202, or R203 by means of a bank 61 of switches 60, 62 or 64, which control the gain of amplifier 56 by furnishing the feedback required to provide an average output in a manner well known in the art. The values of resistances R201, R202, and R203 are selected in the ratio of 1 to ½ to ¼ so that the bank 61 of the switches is in a binary arrangement for reasons of economy and simplicity. These resistances have the value of 100K, 49.9K and 24.9K respectively. This is done because the value of resistances R in the averaging network is 100K, and this provides the amplifier 56 with a gain of 1 when switch 60 only is closed as will be described below. The averaged output of operational amplifier 56 is fed into the input 66 of another 741 amplifier 68 for inversion. This is achieved by selecting R204 and R205 to be 100K in value to provide amplifier 68 with a gain of one. The output of amplifier 68 is fed through line 70 to the comparator circuit as will be described below.

A consideration of the averaging circuit described to this point shows that if one of the sensors was removed or was broken, the averaged output from the amplifier 56 would be greatly affected because it would appear as if one of the sensors was located in a very cold place. This could cause the boiler to operate at a temperature higher than necessary, causing loss to the owner or operator of the building. To prevent this from happening, identical reverse biased diodes 72 are connected to each resistance R, as shown in FIG. 5. The cathodes of the diode are connected between resistances 206 and 207 which are 24.9K and 7.32K in value. Resistance 207 is connected to a 10 volt power terminal while resistance 206 is grounded. With this arrangement, if a sensor or a line from the sensor breaks, the diode connected to the resistance R of the affected sensor becomes conductive and provides a predetermined voltage to the resistance R to simulate the effect of 55° F. on a sensor. The temperature represented by this voltage, applied to resistance R, is slightly lower than that which is likely to be found in normal circumstances anywhere in the building. Yet it does not substantially affect the average output from amplifier 56 or the operation of the control circuit in boiler 32.

Of course, if the transducers or temperature sensors were of a kind wherein the sensor's output was negative and decreases the temperature, the diodes would have to be connected to a negative voltage source in a manner well known in the art. Since some transducers do, in fact, function that way, the voltage averaging circuit shown in FIG. 5 could be easily modified to cover such a circumstance.

In the embodiment shown, 7 sensors are adapted to be connected to this averaging circuit. In actual use, the number of sensors would vary as circumstance requires.

Figure 6:
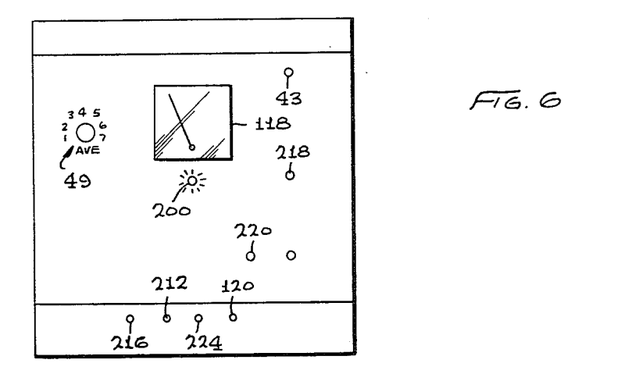
FIG. 6 is an elevational view of the operating panel of the heat control unit constructed according to the principles of this invention.
Figure 8:
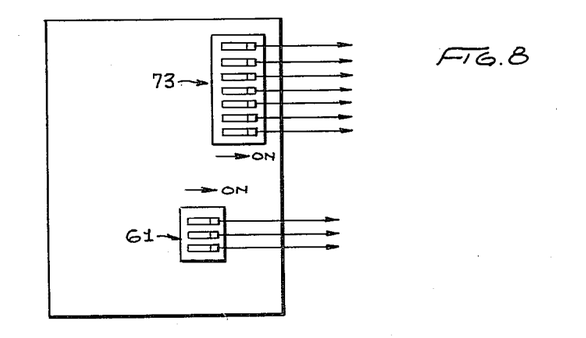
FIG. 8 is an elevational view showing the arrangement of the switches on the averaging board for selecting the sensors to be used and for connecting them in such a way as to obtain an electrical signal proportional to the average value of the output of the sensors.

To vary the number of sensors connected to this circuit, each sensor circuit is connected to a resistance R which, in turn, is connected to an input bus 58 through a bank 73 of switches 74, 76, 78, 80, 82, 84, and 86, see FIGS. 5, 6 and 8. With this arrangement, only the switches connected to sensors actually in use in the building would be closed.

As stated above, the bank 61 of the switches controls the gain of amplifiers 56 in accordance with the number of sensors used in a building. When only switch 60 in bank 61 is closed, amplifier 56 produces a gain of 1. This is used only if only one sensor is employed with this heat control circuit. Closing switch 62 alone causes the output to produce a gain of one-half which is used if two sensors are employed in the building. Closing switch 64 produces a gain of one-fourth, and is used when four sensors are employed. Closing switches one and two together produces a gain of one-third and are used when three sensors are employed. Closing switches one and three produces a gain of one-fifth and averages the value of five sensors. Closing switches two and three generates a gain of one-sixth for averaging six sensors, and closing switches one, two and three generates a gain of one-seventh for averaging seven sensors.

To this point, the averaging circuit is built around sensors or transducers which generate a voltage proportional to the ambient temperature. It would, of course, be possible, using conventional techniques, to modify the circuit shown in FIG. 4 so its output is a current proportional to the ambient temperature. If this were done, the averaging circuit would have to be modified somewhat in that the resistances R, which presently convert the temperature-related voltage to a proportional current, would not be required and the diode 72 would have to be replaced by other circuit devices which perform the same function. But such a modification would be well within the capacity of a person skilled in the art and such a modification is contemplated.

The output of the averaging circuit is connected through line 70 to terminal 88 of rotary switch 49. The remaining terminals of switch 49 are, as stated above, connected to the output of each temperature sensor, see FIG. 3. The wiper 51 of switch 49 is connected to the input of a differential amplifier 92. This amplifier is also an IC #741 and, as will be described below, is used to compare an electrical signal or voltage which is proportional to the average temperature of the sensors used in a building with a predetermined reference signal or voltage to turn the boiler 32 on or off. Resistances R11, R12, R13 and R14 as shown in FIG. 5 are 4.7K, 33K, 330K and 47K, respectively.

As shown in FIG. 5, the electrical signal or voltage proportional to the average of the temperature sensors at terminal 104 is connected to terminal 3 of amplifier 92. The voltage proportional to the reference temperature at terminal 106 is connected to terminal 2 through R14. The reference voltage which is fed into terminal 2 of amplifier 92 is controlled by circuit elements R23 and R25 which are 1K potentiometers. As will be described below, R23 sets a reference voltage for days and R25 sets a reference voltage for nights.

The reference voltage is lowered each night to reflect the decreased heat requirements of the building. This is achieved by means of a time clock 42 shown in FIG. 3 and a solid state relay 96 made by RCA with the number CD 4016AE. This relay is regulated by a 10K resistor R26. Each night, the opening of time clock contacts causes the voltage level on wire 98 to fall to ground at terminal 100 on terminal strip D. To establish the correct voltage on wire 98 in relation to ground, wire 98 is connected to ground through a 10K resistor R1.

The solid state relay 96 shown in FIG. 5 is set for night operation and no power from terminal 210 is connected to line 98. Line 224, the wiper of R25 is connected to terminal 106 and provides the voltage proportional to the reference temperature for night time. In day time, the voltage level on line 98 will rise, causing the relay to power potentiometer R23. Resistances R22 and R24 connected to potentiometer R23 and R25 are 2.2K, and 560 ohms, respectively. Pins 5, 6 and 13 of the solid state relay 96 are switching gates only, no actual connection is made from them to pins 1, 2, 3, 4, 6, or 8.

The output of differential amplifier 92 at terminal 6 is connected to an IC Schmitt trigger 108 made by Motorola and identified as #MC 14583 BAL. When the average temperature from the sensors is smaller than the reference temperature, the Schmitt trigger changes state and acts like a snap-action switch to turn on the boiler. Conversely, if the average temperature becomes greater than the reference temperature by a predetermined amount, the Schmitt trigger reverts to its initial state, turning off the boiler as will be described below.

The Schmitt trigger is biased by potentiometers R2, and resistances R3 and R4, and capacitors C3 and C4. R2 is a 5K potentiometer, resistances R3 and R4 are each 22K, capacitors C3 and C4 are 330 PF and 3 UF in value respectively. As will be described below, R2 is adjusted so the Schmitt trigger changes state to turn on the boiler exactly when the voltage proportional to the average temperature from the averaging circuit falls to the temperature indicated by the reference voltage. R27 is the inhibit gate bias for the Schmitt Trigger. When an outside temperature increase above 55° or 60° F. occurs, contact is made between terminals 180 or 182 and ground. This will bring terminal 15 of the Schmitt Trigger 108 to ground and alter the results which would otherwise cause the Schmitt Trigger to change state and turn on the boiler.

When the trigger 108 changes state, the voltage on terminal 11 of the trigger 108 lowers and causes the base of transistor 110 to lower so the transistor becomes conductive, causing the solid state triac 112 to be conductive. Transistor 110 is a 2N4125 and triac 112 is a solid state switch made by Motorola with the number 2N6070B. The transistor 110 and triac 112 are regulated by resistances R8, R9, and R10 which are 33K, 1.5K, and 100K in value. When the trigger 108 changes state, line 114 is connected to ground. Since line 114 is connected to terminal 192 on terminal strip A and terminal 194 is in the power circuit of boiler 32, the circuit of the boiler 32 is completed. turning the boiler on unti the trigger 108 reverts to its initial state, see FIG. 3.

An electric meter 118 calibrated in terms of temperature is provided. This is to provide the operator of the building with a direct reading of each sensor used in the temperature control unit and in addition to provide a reading of the average temperature throughout the building as determined by the averaging circuit. As will be apparent from the circuit, when the wiper 51 of the rotary switch 49 is at terminal 88, the average voltage from the sensors appears at terminal 104. In order for this voltage, which is proportional to the average temperature of the sensors, to appear on the meter, the blade of switch 120 is connected to read terminal 122. When switch 120 is operated so the blade of the switch contacts terminal 122, voltage at terminal 104 is connected to the input terminal 3 of another amplifier 126 which is also an IC 741. This amplifies the voltage on terminal 104 so meter 118 has an adequate deflection. With these considerations in mind, circuit elements R18, R19, R21 and R20 are selected so they have the following respective values: 47K, 68K and 1.5K. R20 is a 1K potentiometer which is adjusted so the meter has a full scale deflection when the average temperature of the sensors is 85° F.

In order to calibrate the meter 118 so it has a zero deflection at 60° F., which is the lower level of interest to the operator of the control unit and a full scale deflection at 85° F., resistances R15 and R17 are connected to potentiometer R16 as shown. R15 and R17 are 8.2K and 3.9K in value, respectively and R16 is a 1K potentiometer. In order to actually do this, advantage is taken from the designed characteristics of the sensor circuit shown in FIG. 4 in that the voltage difference between terminals 46 and 48 is two volts when the temperature around the sensor is 60° F. and three volts when the temperature around the sensors is at 85° F. Terminals 48, 46 and 45 on sensor 20 are connected to terminal strip A at terminals 128, 130, and 132, respectively. Accordingly, potentiometer R16 can be adjusted by first impressing two volts across terminals 128 and 130 and adjusting the wiper 125 of potentiometer R16 until meter 118 has a zero deflection scale. Then a three volt difference is impressed across terminals 128 and 130 and the wiper 126 of potentiometer R20 is adjusted until meter 118 shows a full scale deflection.

Terminals 48, 46, and 45 of sensors 22 are connected to terminals 134, 136, and 138 of terminal strip B. Terminals 48, 46 and 45 of sensors 24 are connected to terminals 140, 142 and 144 of terminal strip B. Terminals 48, 46 and 45 of sensor 26 are connected to terminals 146, 148 and 150 of terminal strip B. Terminals 48, 46 and 45 of sensor 28 are connected to terminals 154, 156 and 158 of terminal strip C. Terminals 48, 46 and 45 of sensor 30 are connected to terminals 160, 162 and 164 of terminal strip C. Terminals 48, 46 and 45 of sensor 31 are connected to terminals 166, 168 and 170 of terminal strip C. The outside sensor 44 which is temperature sensitive mercury switch is selected so it closes at 55° F. and 60° F., respectively. Terminals 172 and 174 and 176 of these sensors are connected to terminals 180, 182 and 184 of terminal strip A, and terminals 186, 188 and 190 shown in FIG. 1 are connected to terminals 192, 194 and 196 of terminal strip A.

The output of sensors 20, 22, 24, 26, 28, 30, and 31 are connected to terminal 130 of terminal strip A, terminal 136 of terminal strip B, terminal 142 of terminal strip B, terminal 148 of terminal strip B, terminal 156 of terminal strip C, terminal 162 of terminal strip C and terminal 168 of terminal strip C. These terminals are connected to terminals 130A, 136A, 142A, 148A, 156A, 162A, and 168A of the rotary switch 49 as shown in FIGS. 3 and 5.

With this arrangement, whenever it is desired to know the temperature surrounding a particular sensor in the building, the wiper 51 of the rotary switch 49 is rotated to the corresponding terminal, i.e., terminal 130A for sensor 20. Since the wiper is connected to terminal 104 and switch 120, the meter will produce a direct reading of the sensor temperature. Similarly, if the wiper is connected to terminal 88, the meter will read the average temperature of the sensors.

The heat control circuit 10 is provided with a 20 milliamp 1.5 volt L.E.D. indicator lamp 200. This light is connected to terminal 202 of terminal strip D. Terminal 202 is connected to terminal 204 on terminal strip D by a bus wire 205. Terminal 204 is connected to the collector of transistor 110. At the same time, the other end of the light 200 is connected to a 15 volt DC source through wire 208. In this way, when the Schmitt trigger changes state the transistor 110 becomes conductive, causing the light to turn on. As this happens, the triac 112 also becomes conductive. Consequently, light 200 goes on when the boiler operates. This also provides a test of the circuit in that if the boiler is not operating while the light 200 is on, it indicates to a high degree of probability that the defect is somewhere in the boiler hardware, such as in the pressure control, fuel valve, or pilot thermocouple, and not in the heat control circuit. The timer switch on clock 42 is connected to terminals 210 and 100 on terminal strip D. These are connected together when the time clock switch is activated. This causes the potential on wire 98 to rise to 15 volts, which, as stated above, activates the solid state relay 96 and changes the reference voltage from a night to day value, or from a day to night value.

Power to the control circuit is provided from two power supplies. These are a 15 volt supply 212 and a hightly stable 10 volt supply 214. The power supply regulator 212 is provided by a IC UA7815 made by Fairchild Company, and power supply regulator 214 is #LM340LAZ10 made by National Semiconductor. The 15 volt regulator powers the amplifiers, switches, and the 10 volt regulator, while the 10 volt regulator is connected to the sensors which require very great voltage stability. This arrangement whereby the 10 volt regulator is powered by the 15 volt regulator isolates the temperature control unit from power line electrical noise. This circuit is also provided with a diode #IN4002 along with a 50 Uf capacitor C1 to rectify and smooth the 24 volt a.c. output from transformer 18.

As described above, the boiler 32 turns on whenever the average temperature represented by the voltage at terminal 104 is greater than the reference temperature represented by the voltage at terminal 106.

The circuit shown in FIG. 5 requires another adjustment known as a temperature rise adjustment. The purpose of this adjustment is to make this heat control system applicable to buildings heated by steam, hot water, or forced air systems. As stated above, a building heated by steam has substantially different problems than a building heated by hot water or forced air. This is because in steam heated buildings, the steam in the radiators 37 condenses when the boiler is off. This causes a heat discontinuity between the temperature in the radiators 37 and the temperature in lines 35 to the boiler. In contrast, in buildings heated by hot water or forced air, there is always a functional relationship between the temperatures in the radiators and the temperature in the lines to the boiler. As a consequence, when the boiler in a steam heated building goes on, no heat is supplied to a space by the radiator until after the radiator 37 is filled with steam. This could be a problem, so to make certain that a space gets adequate heat after the boiler turns on, a time delay or equivalent is necessary to permit all the steam lines and radiators in the building to be filled with steam before the boiler turns off. Otherwise, it could happen that some spaces or rooms in a building would never heat at all. This time delay or adjustment is accomplished by means of a temperature rise circuit connected to the Schmitt trigger as described below.

The Schmitt trigger is biased by the potentiometer R7 which is the temperature rise adjustment. R7 is a 20K potentiometer and this potentiometer is associated with resistances R5 and R6 which are 3.3K and 22K respectively, and with a 330 pF capacitor, C3. The effect of adjusting the wiper 216 of potentiometer R7 is to prevent the Schmitt trigger 108 from reverting to its initial state until the voltage difference between the voltage terminal 104 (the average of the temperature sensors) and the voltage on terminal 106 (the reference temperature) exceeds a predetermined amount which causes the radiators in the building to be filled with steam before the boiler turns off. This adjustment makes the heat control system selectively adaptable for a steam heated building or buildings heated by other means.

To operate the heat control system, switch 218 is put in operate position. Switch 120 is put in read position and switch 220 is put in operate position. In the event of a failure of a control system, switch 220 is put in manual position. This bypasses the control circuit so the boiler can operate manually until the control system is repaired. Switch 218 has a test position. This is used when it is desired to read the output of the sensors, or the average value of the sensors, while the boiler is off and when it is not desired to turn the boilers on. To do this, switch 120 must be in the read position. When switch 120 is in a set position, the meter reads the day or night reference temperature. The day temperature controlled by potentiometer R23 is adjusted while the external time clock is on. The night temperature controlled by potentiometer R25 is adjusted while the time clock is off.

To adjust the temperature rise control, switch 218 is put in the test position and switch 120 is in the set position while switch 220 is in the operate position. Then wiper 212 of potentiometer R23 or wiper 224 of R25 (depending on which is activated) is increased until the light 200 turns on (indicating the boiler is on). At that time, the temperature on the meter is recorded. Then wiper 212 is decreased until the light goes off and this temperature is recorded. The difference between these temperatures is the temperature rise. To vary this, wiper 216 of potentiometer R7 is then adjusted until the desired variation required for the building is observed.

Having shown and described the invention, what I claim is new is:

1. A heat control of the class described, comprising a plurality of temperature sensors, an averaging circuit, the electrical output of each temperature sensor connected to the input of the averaging circuit, the output of the averaging circuit being an electrical signal proportional to the average of the temperatures sensed by each temperature sensor, a comparator circuit, said comparator circuit including a reference electrical signal proportional to a reference temperature, the output of the averaging circuit and the reference electrical signal connected to the input of the comparator circuit, the output of the comparator circuit adapted to be connected to a heat producing device in such a way that the comparator circuit causes the heat producing device to turn on when the average of the temperature sensed by each temperature sensor is less than the reference temperature and turns the heat producing device off when the average of the temperatures is greater than the reference temperature and means connected to the output of each temperature sensor and the averaging circuit for providing an electrical signal at each sensor input to the averaging circuit to replace any signal lost by reason of a failure of a sensor or a line connected from a sensor to the averaging circuit, said electrical signal proportional to the lowest temperature likely to be encountered by a sensor in normal circumstances whereby the effect of said failure on the averaged output from the averaging circuit is minimized.

2. The heat control described in claim 1 including a meter, switching means connected between each temperature sensor, and the output of the averaging circuit, and the meter in such a way that the temperature sensed by each sensor and the average of the temperatures sensed by the sensors at the output of the averaging circuit can be correctly read on the meter by operation of the switching means.

3. The heat control described in claim 1 including a day reference voltage and a night reference voltage, a timer connected to said reference voltages in such a way that in day time the day reference voltage is connected to the input of the comparator circuit and at night the night reference voltage is connected to the input of the comparator circuit so that the boiler maintains an average lower temperature for a building at night.

4. The heat control described in claim 1 including an outside temperature sensor switch, said outside temperature sensor switch connected to the heat control system in such a way that the boiler is turned off whenever the outside temperature exceeds a predetermined value.

5. A heat control of the class described comprising a plurality of temperature sensors, an averaging circuit, the electrical output of each sensor connected to the input of the averaging circuit, the output of the averaging circuit being an electrical signal proportional to the average of the temperatures sensed by each temperature sensor, a comparator circuit, said comparator circuit including a reference signal proportional to a reference temperature, the output of the averaging circuit and the reference signal connected to the input of a comparator circuit, the output of the comparator circuit connected to a control circuit, said control circuit adapted to be connected to a boiler in such a way that the control circuit is actuated to turn on the boiler when the reference temperature is greater than the average of the temperatures, said control circuit having a first adjustment means for causing the control circuit to operate to turn on the boiler when the boiler is off and the average of the temperatures falls to the reference temperature, a second ajustment means connected to the control circuit for preventing the control circuit from turning the boiler off until after the average of the temperatures exceeds the reference temperature by a predetermined amount.

6. A heat control of the class described comprising a plurality of temperature sensors, an averaging circuit, the electrical output of each temperature sensor connected to the input of an averaging circuit, the output of the averaging circuit being an electrical signal proportional to the average of the temperatures sensed by each temperature sensor, a comparator circuit, said comparator circuit including an electrical reference signal proportional to a reference temperature, the output of the averaging circuit and the reference signal connected to the input of the comparator circuit, the output of the comparator connected to a control circuit, said control circuit adapted to be connected to a boiler in such a way that the boiler turns on when the reference temperature is greater than the average of the temperatures, said control circuit having a first adjustment means for causing the control circuit to operate to turn the boiler on when the average of the temperature falls to the reference temperature, a second adjustment means connected to the control circuit and biasing the control circuit to prevent it from changing state and turning off the boiler until after the average of the temperatures exceeds the reference temperature by a predetermined amount determined by the adjustment of said second adjustment means whereby the heat control system is selectively compatable with buildings heated by steam and buildings heated by other means.

7. The heat control unit described in claim 6 wherein the control circuit is a regenerative bi-stable trigger circuit and a first and second adjustment means comprise first and second potentiometers connected to said trigger circuit.

8. The heat control unit described in claim 7 wherein the trigger circuit is a solid state Schmitt trigger.

9. The heat control described in claim 6 including a combined indicator and test light, said indicator and test light connected to the heat control in such a way that it turns on when the boiler turns on and turns off when the boiler turns off and in such a way that if the light is on while the boiler is off it indicates that the boiler controls are defective and the heat control is not defective.

10. A heat control system of the class described comprising a plurality of temperature sensors, an averaging circuit, the electrical output of each temperature sensor connected to the input of the averaging circuit, the output of the averaging circuit being in the form of an electrical signal proportional to the average of the temperatures sensed by each temperature sensor, a comparator circuit, said comparator circuit including a reference temperature in the form of an electrical signal, the output of the averaging circuit and the reference signal connected to the input of the comparator circuit, the output of the comparator circuit adapted to be connected to a boiler in such a way as to cause the boiler to turn on when the reference temperature is greater than the average of the temperatures and to turn off when the reference temperature is less than the average of the temperatures, and adjustment means for making the heat control system selectively compatable to the buildings heated by steam heat and buildings heated by other means.

11. The heat control system described in claim 10 including adjustment means connected to the heat control system for making the heat control system selectively compatible with buildings heated by steam and buildings heated by other means.

12. The heat control system described in claim 10 wherein the reference temperature includes a day reference temperature and a night reference temperature, a timer connected to said heat control system in such a way that during the day a signal related to the day reference temperature is connected to the input of the comparator circuit and at night a signal related to the night reference temperature is connected to the input of the comparator circuit so that the boiler maintains an average lower temperature at night.

13. A heat control system for a building comprising a plurality of temperature sensors, said temperature sensors positioned at corners of the building remote from the boiler and on the first and top floors of the building, an averaging circuit, the electrical output of each temperature sensor connected to the input of the averaging circuit, the output of the averaging circuit being an electrical signal proportional to the average of the temperature sensed by each temperature sensor, a comparator circuit, said comparator circuit including a day reference temperature and a night reference temperature in the form of a day electrical signal and a night electrical signal, a timer connected to the heat control system in such a way that the day electrical signal is connected to the input of the comparator circuit during the day and the night electrical signal is connected to the input of the comparator circuit during the night in order to maintain a lower average temperature in the building at night, the electrical signal at the output of the averaging circuit connected to the input of the comparator circuit for comparison with the reference signal at the input, the output of the comparator circuit connected to a regenerative bi-state trigger circuit, said trigger circuit adapted to be connected to a boiler in such a way that the trigger changes state and causes the boiler to turn on when the reference temperature is greater than the average of the temperatures sensed by each sensor and turns off the boiler when the reference temperature is less than the average of the temperatures, and an electrical meter connected to said heat control system calibrated in terms of temperature, switching means in the heat control system for selectively connecting the sensors and the signal proportional to the average temperature of the sensors to the meter so that the temperature sensed by each sensor and their average can be read on the meter by adjustment of the switching means, a first adjustment means connected to the trigger in such a way that the boiler turns on exactly when the average of the temperatures falls to the reference temperature as indicated on the meter, a second adjustment means connected to the trigger in such a way as to prevent the trigger from changing state after the boiler turns on until after the average of the temperatures exceeds the reference temperature by a predetermined amount, whereby the heat control system can be adjusted so it is compatible with buildings heated by steam and buildings heated by other means.

14. The heat control system described in claim 15 including a combined indicator and test light, said indicator and test light connected to the heat control system in such a way that the light turns on when the boiler is on and the light turns off when the boiler is off and in such a way that if the light remains on when the boiler is off there is an indication that the boiler controls are defective and the heat control system is not defective.

* * * * *